Dec. 8, 1970   R. E. BOWLES   3,545,068
PRESSURE AMPLIFICATION
Filed July 12, 1967
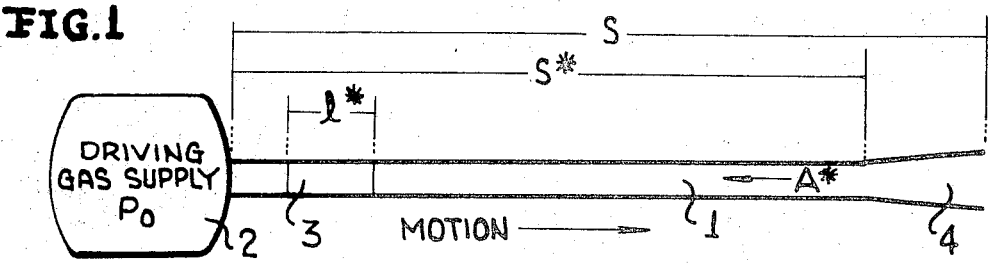
FIG. 1
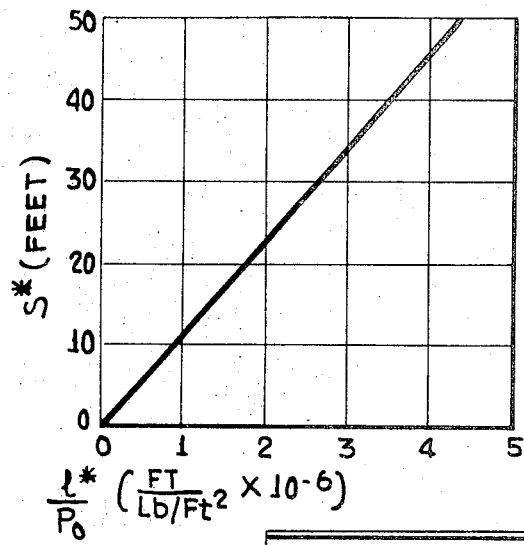
FIG. 2
FIG. 3
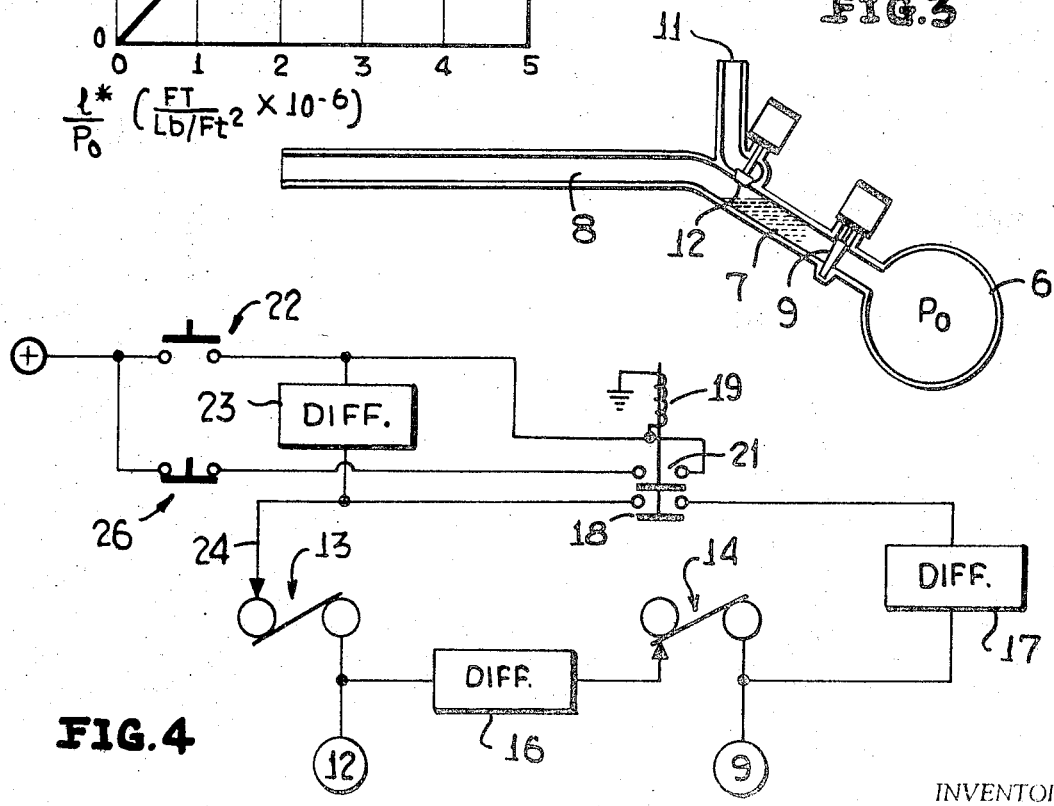
FIG. 4
INVENTOR
ROMALD E. BOWLES
BY *Hurvitz, Rose & Greene*
ATTORNEYS

United States Patent Office

3,545,068
Patented Dec. 8, 1970

3,545,068
PRESSURE AMPLIFICATION
Romald E. Bowles, Silver Spring, Md., assignor to Bowles Engineering Corporation, Silver Spring, Md., a corporation of Maryland
Filed July 12, 1967, Ser. No. 652,860
Int. Cl. B23p 17/00
U.S. Cl. 29—421                                                    19 Claims

ABSTRACT OF THE DISCLOSURE

High impact pressures of liquids on a surface are produced with relatively low pressure gas sources by accelerating a slug of liquid to a velocity less than (subsonic), equal to (sonic), or greater than (supersonic) the velocity of sound in the driving gas. Total pressure of the liquid on impact with a surface is approximately equal to one-half the density of the liquid times its velocity squared. The invention thus takes advantage of the difference in densities between gases and liquids to use relatively low pressure gas to accelerate a liquid to a high velocity and achieve high total pressures at impact as a result of the high density of the liquid.

BACKGROUND OF THE INVENTION

Numerous attempts to employ high pressure liquids for mining, drilling, impact molding and related functions have been made. The problems encountered with devices of this type relate to the difficulty of generating and/or storing and directing flow of liquids at extremely high pressures; that is, pressures of the order of magnitude of 50,000–200,000 pounds per square inch. For instance, the difficulty of a piston attempting to produce water pressures of 100,000 pounds per square inch become severe not only as a result of the strain on the piston and the driving parts but also because of the erosion of the piston face. Further, the erosive effect of such a fluid in flowing from storage regions into and through pipes introduces severe problems to say nothing of the cost of such equipment. Subjecting parts, mechanisms and entire equipments to such pressures produces severe maintenance problems, in addition to the extreme initial cost of the system.

SUMMARY OF THE INVENTION

The present invention provides a mechanism which is never subjected to the high pressures produced thereby. The system employs a gas at pressures; for instance, of 100–10,000 pounds per square inch to generate liquid impact pressures of 1,000–300,000 pounds per square inch or higher. A liquid slug is subjected to a gas pressure and is accelerated by this gas pressure down a long tube. The tube is made sufficiently long that the liquid slug achieves the sonic velocity or approximately the sonic velocity of the gas. Internally of the long tube, the liquid is never subjected to a pressure which is greater than the pressure of the gas and thus, the walls of the tube are not subject to pressures which are greater than the pressure of the gas. The high pressures are recovered upon impact of the fluid with a surface. Specifically, the impact pressure is proportional to the velocity squared times the density of the liquid, the higher density of the liquid relative to the gas insuring a substantially higher pressure than would have been available from the gas if this were merely blown against the surface to be contacted.

It is an object of the present invention to provide pressure amplification by accelerating a liquid to a high velocity by use of a gas driver and recovering high pressure by impacting the liquid against a surface to be treated.

It is another object of the present invention to provide a practical loading system for the pressure amplifier of the invention.

The above and still further objects, features and advantages of the present invention will become apparent upon consideration of the following detailed description of one specific embodiment thereof, especially when taken in conjunction with the accompanying drawings, wherein:

FIG. 1 is a diagrammatic illustration of an apparatus of the invention capable of producing high impact pressures;

FIG. 2 is a graph of the length of the accelerating tube employed as a function of the length of a slug of water or liquid divided by the input pressure to the system;

FIG. 3 is an illustration of a practical apparatus for repetitively delivering liquid slugs at the high velocities involved; and FIG. 4 is a diagram of an electrical circuit for cycling the apparatus of FIG. 3.

DESCRIPTION OF EMBODIMENTS OF THE INVENTION

Referring specifically to FIG. 1 of the accompanying drawings, there is illustrated an elongated tube 1 connected at its left end to a source 2 of highly pressurized gas. A slug of liquid 3 is illustrated as disposed in the tube 1, the tube terminating at its right end in a flaring supersonic nozzle 4. The drawing has various letters applied to portions thereof, which letters are employed in the equations which follow:

The total jet pressure at impact of the slug 3 after issuing from the end of tube 1 is indicated by:

$$P_\mathrm{I} = \frac{1}{2}\rho V^2 \qquad (1)$$

where $P_\mathrm{I}$ is in pounds per foot square, $\rho$ is the density of the liquid in slug 3 in slugs per cubic foot, and $V$ is in feet per second. If the working fluid is water $$\frac{\rho}{2} = \frac{62.45}{64.4} \text{ slugs per cubic foot}$$

and $$P_\mathrm{I} = \frac{62.45}{64.4}(V^2) \text{ p.s.f.}$$

$$P_\mathrm{I} = .97\,(V^2) \text{ p.s.f.} \qquad (2)$$

from which:

$$V = 1.015\sqrt{P_\mathrm{I}} \text{ f.p.s.} \qquad (3)$$

The following approximations are used for purposes of the following calculations:

$$V \doteq \sqrt{P_\mathrm{I}} \text{ f.p.s.}$$

$$P_\mathrm{I} \doteq V^2 \text{ p.s.f.}$$

$$p \doteq \frac{V^2}{144} \text{ p.s.i.}$$

$$V \doteq 12\sqrt{p} \text{ f.p.s.} \qquad (4)$$

Table I illustrates various solutions of Equation 4:

TABLE I

| "V" (f.p.s.): | "p" (p.s.i.) |
|---|---|
| 120 | 100 |
| 1,200 | 10,000 |
| 2,400 | 40,000 |
| 3,600 | 90,000 |
| 4,800 | 160,000 |
| 6,000 | 250,000 |
| 7,200 | 360,000 |
| 8,400 | 490,000 |

From Table I it is apparent that jet speeds of the order of 3,800 f.p.s. and higher provide jet effective pressures of 100,000 p.s.i. and higher.

In order to determine the gas pressures required for various liquid velocities, the equations of motion are employed. Referring to FIG. 1 and relating the mass of a slug to the dimensions employed therein:

$$m = \rho A^* l^* \quad (5)$$

The applied force is established by the pressure drop across the slug:

$$F = PA \quad (6)$$

$$\text{Also } F = m\ddot{x} \quad (7)$$

where $\ddot{x}$ is the acceleration in feet per second square of slug 3 in a downstream direction in tube 1.

$$PA = \rho A^* l^* \ddot{x}$$

where $A^*$ is the cross-sectional area of tube 1 of FIG. 1. In the subsonic portion of the device, $$A = A^*$$

Then $$P = \rho l^* \ddot{x}$$

$$\ddot{x} = \frac{P}{\rho l^*} \quad (8)$$

The initial pressure is a function of the length of the unflared part of the tube ($S^*$) and the length of the slug ($l^*$) 3. The relationship is found again from the equations of motion. Letting $t^* =$ time to achieve the velocity $V^*$ of the slug $$S^* = \frac{1}{2} \ddot{x} t^{*2} \quad (9)$$

$$V^* = \ddot{x} t^*$$

$$t^* = \frac{V^*}{\ddot{x}} \quad (10)$$

Substituting Equation 10 for $t^*$ in Equation 9

$$S^* = \frac{1}{2} \frac{V^{*2}}{\ddot{x}} \quad (11)$$

and substituting Equation 8 for $\ddot{x}$ $$S^* = \frac{1}{2} \frac{\rho l^* V^*}{P}$$

Thus far the equations are general and it is now necessary to assume a specific example to determine final constants of a practical system.

It is assumed that the slug 3 is water and that the gas is steam at 1340° F. The speed of sound at this temperature is 2500 feet per second. If a sufficiently long, constant cross section, tube 1 is employed, the liquid can be accelerated to the velocity $V^*$ (which is a Mach number of 1 for the driving gas). During this acceleration the driving force changes. When the liquid slug is at rest, the full gas supply pressure "$P_0$" is applied. However, as the liquid slug accelerates, the driving gas pressure drops to a lower value, which at Mach 1 is 54.57 percent of $P_0$, if the value of $\gamma$, specific heat ratio, is 1.3. The value of $\gamma = 1.3$ for the water vapor is an approximation which holds true only at about 540° F. and not throughout the full range of the calculations. As a further conservative approximation, it is assumed that the accelerating pressure is at the lower level of 54.57 percent of $P_0$ for the entire subsonic acceleration period; that is, from $0 \leq \ddot{x} \leq V^*$. For water $\rho = 2$ slug/ft. and thus:

$$\ddot{x} = \frac{1}{2}(.5457)\frac{P_0}{l^*} \text{ ft.} = \text{constant} \quad (12)$$

Substituting Equation 12 in Equation 11 and using a velocity $V^*$ of 2500 ft./sec.

$$S^* = 144(.7950 \times 10^5)\frac{l^*}{P_0} \text{ ft.} \quad (13)$$

Referring now to FIG. 2 of the accompanying drawing, there is provided a plot of Equation 13, i.e., $S^*$ as a function of $l/P_0$. If it is assumed that the tube is 20 feet long then $$\frac{l^*}{P_0} = 1.74 \times 10^{-6} \text{ ft./lb./ft.}^2$$

Assuming a $P_0$ of 1000 p.s.i. $l^* = 3$ inches.

Thus, a gas presusre of 1000 p.s.i. produces a velocity of 2500 ft./sec. and from Table I an impact pressure of 44,000 p.s.i. If a 40-ft. tube 1 is employed then a 6-inch slug 3 may be employed. The use of a longer tube thus permits the system to deliver a larger slug of liquid at Mach 1 velocity and thus increase the total energy delivered to the load.

If pressures, for instance, of 100,000 p.s.i. are required, the sonic velocity of the driving fluid must be raised to about 3,800 ft./sec. and this requires a steam temperature, if steam is to be the driving fluid, of approximately 3340° F.

It should be noted that the tube 1 terminates in a supersonic nozzle and by raising the sonic gas flow to supersonic flow still higher pressures may be achieved. In a recent test, a tube was employed having a constant diameter of .542 inch over the region 1 and a maximum diameter of .596 inch at the end of the divergent nozzle 4. The nozzle 4 was six inches long and the tube 1 was eighteen feet long. The slug 3 was fifteen inches long at starting and was water. The driving gas was air at a pressure of 950 p.s.i. The velocity of the water slug upon exiting from the apparatus was approximately 1,240 ft./sec. which velocity is obviously supersonic. The actual Mach number is quite difficult to determine since, by the time the slug reached the end of the tube, the driving medium was a mixture of air and water, which mixture has a sonic velocity less than either air or water. In any event, the Mach number was greater than 1.08.

The presence of a mixture of air and water behind the slug results from stripping of water from the periphery of the slug, due to friction at the water-tube interface, and subsequent mixing of the water with the driving fluid behind the slug. This phenomena also shortens the length of the water slug expelled from the system. With a fifteen-inch slug of water at starting and no losses, a slug of approximately twelve inches should have been expelled. The length of the expelled slug was roughly eight inches. Thus, a slug of water of at least two cubic inches was accelerated sufficiently by a 950 p.s.i. gas source to exert a pressure of in excess of 10,000 p.s.i., see Table I.

There was no attempt in the above test to optimize performance of the system. The test was conducted to prove conclusively that a slug of liquid could be accelerated to supersonic velocity by gas pressures of reasonably low values.

If again steam is considered as the driving gas at a specific heat ratio of 1.3, the limit gas velocity is at Mach number $M^* = 2.769$. This value is purely theoretical and can be obtained only with an area ratio $A/A^*$ of infinity where A is the area at the output end of the divergent nozzle 4 and $A^*$ is the area of tube 1. Also, this velocity is obtained only if discharging into a vacuum. A more practical limit velocity is a Mach number of $M^* = 2.4$ at which value $$\frac{A}{A^*} = 27.39 \text{ and } \frac{P}{P_0} = 2.36 \times 10^{-3}$$

where P is the pressure into which the slug is discharged and $P_0$ is the pressure of the driving gas. Considering ambient pressure as atmospheric $P_0 = 6125$ p.s.i., discharge velocity would be 6,000 ft./sec. disregarding losses and the impact pressure of the slug would be 250,000 p.s.i. The optimization of the system, or more particularly, parameters such as length of nozzle, area, etc. will require further experimentation but certain approaches can be at least partially indicated by a theoretical approach as follows:

$$F=m\ddot{x}$$

From Equation 8 and compensating for change of area in the supersonic nozzle 4

$$\ddot{x}=\frac{PA}{\rho A^* l^*}$$

Rearranging $$\ddot{x}=\frac{P_0}{\rho l^*}\left(\frac{P}{P_0}\right)\left(\frac{A}{A^*}\right) \quad (14)$$

Assuming a steady state condition where $$\left(\frac{P}{P_0}\right)\left(\frac{A}{A^*}\right)=.2$$

$$\ddot{x}=\frac{P_0}{\rho l^*}(.2)$$

The velocity at the end of the supersonic portion of the driver is the sonic velocity plus acceleration in the nozzle 4 or $$V=V^*+.2\frac{P_0}{\rho l^*}(t-t^*) \quad (15)$$

where $t$ is total time and $t^*$ is time in the tube 1. If a velocity of 6,000 ft./sec. is assumed as in the example above and substituting in Equation 15

$$6,000=2,500+.2\frac{P_0}{\rho l^*}(t-t^*)$$

Then $$(t-t^*)=17,500\frac{\rho l^*}{P_0} \quad (16)$$

Total barrel length $$S=S^*+(2,500+1,750)(t-t^*) \quad (17)$$

From Equations 13 and 16, Equation 17 becomes $$S=144\ (.7950\times 10^5)\frac{l^*}{P_0}+(4250)\ (17,500\rho)\frac{l^*}{P_0}$$

$$S=144\ (1.113\times 10^6)\frac{l^*}{P_0} \quad (18)$$

Table II below lists various solutions to Equation 18 in terms of total length of the barrel S and $l^*/P_0$, the ratio of slug length to driving pressure.

TABLE II

| "S": | $l^*/P_0$ |
|---|---|
| 10 | $.0625\times 10^{-6}$ |
| 20 | $.125\times 10^{-6}$ |
| 30 | $.188\times 10^{-6}$ |
| 40 | $.250\times 10^{-6}$ |
| 50 | $.312\times 10^{-6}$ |
| 60 | $.375\times 10^{-6}$ |
| 70 | $.437\times 10^{-6}$ |
| 80 | $.500\times 10^{-6}$ |
| 90 | $.562\times 10^{-6}$ |
| 100 | $.625\times 10^{-6}$ |

The above mathematical considerations, with respect to both sonic and supersonic operation, have not taken into account losses in the system particularly friction losses. Compensation for friction losses may be achieved by overpressuring the source. Also as indicated above, the effective length of the slug will be less than the initial length of the slug due to frictional stripping of peripheral liquid at the barrel-slug interface. On the plus side, there are other factors which enhance performance of the system. The speed of sound of low molecular weight gases is higher than higher molecular weight gases so that low molecular weight gases should be employed as the driving fluid. Also, the speed of sound of gases increases with temperature so that one may employ a heated driving gas to increase sonic velocity and thus velocity of the liquid.

Referring now specifically to FIG. 3 of the accompanying drawings, there is illustrated a practical method of utilizing the principles of the apparatus of the present invention. Specifically, a source of fluid under pressure 6 is connected to supply fluid to an inclined portion 7 of a generally horizontal pipe 8. A gate valve 9, which may be solenoid operated, is employed to block the region 7 of the pipe slightly downstream of the supply tank 6. Liquid is supplied by any conventional means to a pipe 11 having a solenoid actuated valve 12 disposed at approximately the junction of the pipe 11 and the incline portion 7 of the pipe 8. By opening the valve 12, water flows into the portion 7 of the pipe above the gate valve 9 to a maximum level determined by the lower wall of the pipe 8 which, for purposes of explanation, is illustrated as being horizontal in FIG. 3. Lesser amounts of liquid may be employed by simply not filling the region 7 above the valve 9 to the maximum level.

Initially, the system illustrated in FIG. 3 has both of the valves 9 and 12 closed. To start operation, the valve 12 is open to fill the section 7 to the desired level and is then again closed. The valve 9 is then opened and the slug of liquid is projected down the tube 8. A quasi-continuous action can be imparted by simply manually cycling the valves 9 and 12 at an appropriate duty cycle.

A relatively simple circuit for performing the cycling is illustrated in FIG. 4 and comprises a pair of monostable multivibrators schematically illustrated at 13 and 14. The vibrator 13 energizes the solenoid for controlling the valve 12 and the multivibrator 14 controls the solenoid for actuating valve 9. When the righthand section of the multivibrator 13 is on the solenoid of valve 12 is energized and, when the multivibrator times out the falling voltage is transmitted through a differentiator circuit 16 to multivibrator 14 putting it in the "on" condition. The valve 9 is now open for the length of time determined by time out of the monostable multivibrator 14. Termination of the output voltage on the righthand section of this device causing the solenoid to de-energize valve 9 and causing differentiator 17 to pass a pulse back to the multivibrator 13 through switch contacts 18 of a relay 19 having a second set of contacts 21.

To start the circuit, a start button 22 is depressed, energizing the relay 19 and closing sets of contacts 18 and 21. The contacts 21 constitute a holding circuit for the relay 19 so that when the start button 22 is released and opens its contacts, the relay 19 remains energized. The sudden rise in voltage produced by closing the switch 22 produces a pulse, by means of a differentiating circuit 23, which is supplied via lead 24 to the multivibrator 13. Thus, the multivibrator 13 is energized to cause opening of the valve 12 for a predetermined interval which is a function of the desired degree of filling of the region 7 of the pipe 8. Next, the valve 9 is opened and is held open by appropriately timing the multivibrator 14 until the liquid slug is expelled from the end of the tube 8. The turn-off of the multivibrator 14 and closing the valve 9 is followed by re-energization of the multivibrator 13 and the delivery of another slug of fluid to the region 7. When it is desired to stop operation of the system a stop button 26 is depressed and thereby breaks the holding contact of the relay 19 and stops transfer of the differentiated pulse from the differentiator 17 to the multivibrator 13. Thus, the apparatus always stops with the tube 8 empty of liquid.

It should be noted that the angle between the portions 7 and 8 of the tube should not be so great as to present problems in moving the slug of fluid out of the region 7 into the portion 8. Of course, the slug is traveling at a relatively slow rate of speed at the time that it makes the turn and, although there are limitations on this angle, they are not too severe.

It is apparent from the above that extremely high pressures of the order of 1,000–300,000 p.s.i. and higher may be achieved by the apparatus of the invention. Thus, pressure amplifications of 10–200 and higher are readily obtained without the necessity of utilizing true high pressure equipments.

The tube 8 may be made mobile by appropriate mounting on a carriage so that the apparatus may be appropriately positioned relative to a surface to be impacted. Also, if steam is the gas, the chamber 6 may be a boiler which is fed with water and externally heated.

While I have described and illustrated one specific embodiment of my invention, it will be clear that variations of the details of construction which are specifically illustrated and described may be restorted to without departing from the true spirit and scope of the invention as defined in the appended claims.

What I claim is:

1. An apparatus for producing high impact pressures comprising means for supplying a pressurized gas to said apparatus and means for employing the pressurized gas to produce high velocity liquid flow, wherein said means for employing comprises an elongated tube having an open end and a constant cross-sectional area for at least a predetermined length thereof, means for introducing a slug of liquid of predeterminable length into said tube at a predetermined distance from said open end thereof, means for subjecting the end of said slug of liquid remote from said open end to gas pressure sufficient to accelerate a slug of a maximum specified length to the velocity of sound in the gas over the length of said tube of constant cross-sectional area, said open end of said tube being directed toward a surface to be impacted.

2. The combination according to claim 1 wherein said elongated tube terminates in supersonic nozzle means for increasing the velocity of said slug from the velocity of sound in said gas to above the velocity of sound in said gas.

3. An apparatus for producing high impact pressures comprising means for supplying a pressurized gas to said apparatus, means for forming a slug of liquid in said apparatus, means for employing the pressurized gas to flow said slug of liquid at a velocity at least approaching the velocity of sound in the gas and means for directing said slug of liquid against a surface to be impacted.

4. The method of producing high impact pressures against a surface comprising accelerating liquid by means of a gas to at least the velocity of sound in the gas and impacting the liquid thus accelerated against said surface.

5. The method according to claim 4 comprising the initial step of introducing liquid into an open ended tube remote from the open end of the tube and producing acceleration of the liquid toward the open end of the tube by subjecting the liquid to gas pressure.

6. Apparatus for providing impact pressures against a surface, comprising:
   a confined flow path having an upstream end and an open downstream end, said open downstream end being adapted to be directed toward said surface;
   means for injecting a slug of liquid of predetermined volume into said flow path at a first location, said predetermined volume being sufficiently large to cause said slug to block flow therethrough along said flow path; and
   means for applying pressurized gas to said flow path upstream of said first location, the pressure of said gas being sufficiently high to accelerate said slug along said flow path and through said open downstream end into impacting relation with said surface;
   wherein the cross-sectional area of said flow path at any location downstream of said first location is no greater than the cross-sectional area of said flow path at said first location.

7. The apparatus according to claim 6 further comprising nozzle means extending from said downstream end of said flow path for increasing the velocity of said slug.

8. The apparatus according to claim 7 wherein the pressure of said gas and the configuration of said confined flow path are such that said slug reaches the velocity of sound in said gas before flowing out of said downstream end, and wherein said nozzle means includes supersonic nozzle means responsive to application thereto of fluid flowing at the velocity of sound in said gas to provide outflow of said fluid at a velocity above that of sound in said gas.

9. The apparatus according to claim 6 wherein said flow path has a constant cross-sectional area along a predetermined length of the flow path extending between said first location and said downstream end.

10. The apparatus according to claim 9 further comprising nozzle means directly connected to said downstream end for increasing the velocity of said slug.

11. The apparatus according to claim 10 wherein the pressure of said gas is sufficiently great to accelerate said slug to the velocity of sound in said gas over said predetermined length of said flow path, and wherein said nozzle means is a supersonic nozzle including a section which diverges in a downstream direction and configured to provide outflow at a velocity above that of sound in said gas upon receiving inflow at the velocity of sound in said gas.

12. The apparatus according to claim 9 wherein said first location comprises a region in said flow path which is inclined relative to the portion of said flow path extending downstream of said first location, the upstream end of said region being bound by selectively actuable control valve means, and wherein said means for injecting includes second selectively actuable valve means for selectively flowing liquid into said region, said pressurized gas being upstream of said control valve means and disposed to be applied to liquid in said region whenever said control valve means is opened.

13. The apparatus according to claim 12 wherein said control valve means and said second valve means are electrically actuable, said appartus further comprising electrical timing circuit means for cyclically operating both said valve means in sequence such that said second valve means opens for a sufficient time to permit a slug of liquid of said predetermined volume to flow into said region, followed by said control valve means opening to permit application of said pressurized gas to said slug of liquid.

14. Apparatus for providing impact pressures, comprising:
   a confined flow path having an upstream end and an open downstream end;
   means for injecting a slug of liquid into said confined flow path at a first location therein; and
   means for accelerating said slug of liquid in a downstream direction through said flow path and out through said open downstream end, said means for accelerating comprising means for applying pressurized gas to said flow path upstream of said first location such that said slug and said gas flow through said flow path and out of said downstream end.

15. The apparatus according to claim 14 wherein said flow path has a constant cross-sectional area between said first location and said downstream end, said apparatus further comprising nozzle means connected directly to said downstream end for increasing the velocity of said slug.

16. The appartus according to claim 15 wherein the pressure of said gas is sufficient to accelerate said slug to the velocity of sound in said gas, and wherein said nozzle means comprises a supersonic nozzle having a section which diverges in a downstream direction.

17. The method of providing high impact pressures against a surface, said method comprising the steps of:
   forming a slug of liquid; and
   impacting said slug of liquid against said surface by accelerating said slug with pressurized gas and directing the accelerating slug toward said surface.

18. The method according to claim 17 wherein said slug of liquid is accelerated by said pressurized gas to the velocity of sound in said gas.

19. The method according to claim 18 further comprising the step of increasing the velocity of said slug of liquid to above the velocity of sound in said gas by flowing said slug of liquid through a supersonic nozzle before impacting said slug against said surface.

References Cited

UNITED STATES PATENTS

| | | | |
|---|---|---|---|
| 1,751,719 | 3/1930 | Uhri | 103—263 |
| 1,887,985 | 11/1932 | Auker et al. | 103—263 |
| 2,061,032 | 11/1936 | Huff | 103—263 |
| 2,745,647 | 5/1956 | Gilmore | 175—205X |
| 3,070,178 | 12/1962 | Graham et al. | 175—71X |
| 3,099,965 | 8/1963 | Regenscheit | 103—263 |
| 3,137,997 | 6/1964 | Kaminstein | 103—263 |
| 3,371,618 | 3/1968 | Chambers | 103—263 |

JOHN F. CAMPBELL, Primary Examiner

R. J. SHORE, Assistant Examiner

U.S. Cl. X.R.

103—232, 263; 137—206; 175—71, 205, 422